US010619074B2

(12) United States Patent
Takemoto et al.

(10) Patent No.: US 10,619,074 B2
(45) Date of Patent: Apr. 14, 2020

(54) CURING PROCESS OF ULTRAVIOLET CURABLE PAINT

(71) Applicant: Ushio Denki Kabushiki Kaisha, Tokyo (JP)

(72) Inventors: Fumitoshi Takemoto, Tokyo (JP); Makoto Wasamoto, Tokyo (JP); Shinji Suzuki, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 268 days.

(21) Appl. No.: 15/243,478

(22) Filed: Aug. 22, 2016

(65) Prior Publication Data

US 2017/0058085 A1 Mar. 2, 2017

(30) Foreign Application Priority Data

Aug. 26, 2015 (JP) ................................ 2015-166983

(51) Int. Cl.

| | |
|---|---|
| ***C09D 201/00*** | (2006.01) |
| ***H01J 61/76*** | (2006.01) |
| ***B05D 3/06*** | (2006.01) |
| ***H01J 61/44*** | (2006.01) |
| ***C09D 5/22*** | (2006.01) |

(52) U.S. Cl.

CPC .......... *C09D 201/00* (2013.01); *B05D 3/067* (2013.01); *C09D 5/22* (2013.01); *H01J 61/44* (2013.01); *H01J 61/76* (2013.01)

(58) Field of Classification Search

CPC ........ C09D 201/00; C09D 5/22; B05D 3/067; H01J 61/78; H01J 61/44

See application file for complete search history.

(56) References Cited

U.S. PATENT DOCUMENTS

| | | | |
|---|---|---|---|
| 8,801,165 | B2 | 8/2014 | Fassam et al. |
| 9,073,358 | B2 | 7/2015 | Fassam et al. |
| 2012/0206534 | A1 | 8/2012 | Fassam et al. |
| 2014/0313267 | A1 | 10/2014 | Fassam et al. |

FOREIGN PATENT DOCUMENTS

| | | |
|---|---|---|
| JP | 2001-340799 A | 12/2001 |
| JP | 2007-045128 A | 2/2007 |

(Continued)

OTHER PUBLICATIONS

Scherzer et al. "Photoinitiator-free Photopolynnerization of Acrylates Using Short-Wavelength Excimer UV Radiation" RadTech 2006 Technical Proceedings.*

(Continued)

*Primary Examiner* — Robert S Walters, Jr.

(74) *Attorney, Agent, or Firm* — Studebaker & Brackett PC

(57) ABSTRACT

A curing process of an ultraviolet curable paint by which a paint cured layer can be formed on an object to be processed without needing a long time, and intended color can be obtained of the object to be processed on which the paint cured layer is formed. The curing process of an ultraviolet curable paint is one for curing an ultraviolet curable paint through an ultraviolet irradiation step of irradiating a surface of an object to be processed to which the ultraviolet curable paint is applied with ultraviolet rays from an ultraviolet radiation unit. The ultraviolet curable paint is not sensitive to light of not less than 380 nm in wavelength but sensitive to light of less than 380 nm in wavelength. The ultraviolet radiation unit radiates ultraviolet rays having a peak wavelength within a range of not greater than 350 nm in wavelength.

2 Claims, 4 Drawing Sheets

(56) References Cited

FOREIGN PATENT DOCUMENTS

| | | | |
|---|---|---|---|
| JP | 2007-145930 | A | 6/2007 |
| JP | 2010-055782 | A | 3/2010 |
| JP | 2011-034803 | A | 2/2011 |
| JP | 2013-502480 | A | 1/2013 |

OTHER PUBLICATIONS

Bauer et al. "UV curing and matting of acrylate nanocomposite coatings by 172 nm excimer irradiation, Part 2" Progress in Organic Coatings 69 (2010) 287-293.*

Schubert et al. "VUV-induced micro-folding of acrylate-based coatings 1. Real-time methods for the determination of the micro-folding kinetics" Surface & Coatings Technology 203 (2009) 1844-1849).*

Schubert et al. "VUV-induced micro-folding of acrylate-based coatings 2. Characterization of surface properties" Surface & Coatings Technology 203 (2009) 3734-3740.*

Tatsushi Okuda, the characteristics of UV printer's ink and application, "network polymer" vol. 34 No. 5, Japan, 2013, pp. 248-249, and Fig. 3—absorption spectrum of typical photoinitiator.

An Office Action mailed by the Japanese Patent Office dated Aug. 7, 2018, which corresponds to Japanese Patent Application No. 2015-166983 and is related to U.S. Appl. No. 15/243,478.

* cited by examiner

CURING PROCESS OF ULTRAVIOLET CURABLE PAINT

TECHNICAL FIELD

The present invention relates to a curing process of an ultraviolet curable paint.

BACKGROUND ART

An ultraviolet curable resin is a photosensitive material that cures when irradiated with ultraviolet rays. A technique for curing such an ultraviolet curable resin is referred to as a UV curing technique. According to the UV curing technique, for example, an ultraviolet curable resin applied to an object to be processed can be cured for dry processing. An ultraviolet curable resin interposed between two objects to be processed can be cured for adhesion processing of the two objects to be processed.

Processing using the UV curing technique is power saving processing because an ultraviolet irradiation time needed to cure the ultraviolet curable resin is several seconds to several minutes depending on the size of the object(s) to be processed. Since the ultraviolet curable resin can be cured only by the irradiation with ultraviolet rays, the processing is low-temperature processing and the object(s) to be processed can thus be plastics lacking heat resistance, precise electronic parts and the like.

The UV curing technique having the foregoing characteristics is used in various fields.

As specific examples of the use of the UV curing technique, may be mentioned adhesion processing of an electronic part or an optical part by using an adhesive made of an ultraviolet curable resin, drying processing (fixing processing) of printing ink made of an ultraviolet curable resin and drying processing of a coloring paint made of an ultraviolet curable resin on automobile parts, electrical appliances, building materials, plastic parts, etc. (for example, see Patent Literature 1). In the field of paints, the UV curing technique is applied to the drying processing of not only coloring paints but also a luster coating material (hard coat material) on a vehicle body of an automobile, a motorcycle and the like.

An ultraviolet curable paint made of an ultraviolet curable resin contains a photopolymerization initiator, a photopolymerizable monomer and a photopolymerizable oligomer as main components contributing to curing (ultraviolet curing).

For example, the ultraviolet curing of the ultraviolet curable paint is performed through the following curing reaction (ultraviolet curing reaction).

If the ultraviolet curable paint is irradiated with ultraviolet rays, the photopolymerization initiator initially absorbs the ultraviolet rays. The photopolymerization initiator is thereby activated to generate radicals or ions. The generated radicals or ions react (cause a polymerization reaction) with the photopolymerizable monomer and the photopolymerizable oligomer for curing.

The UV curing technique uses a high-pressure mercury lamp or a metal halide lamp as an ultraviolet radiation unit.

The high-pressure mercury lamp includes a quartz glass light emitting tube filled with high-purity mercury and a rare gas. The high-pressure mercury lamp radiates ultraviolet rays having a main wavelength of 365 nm, and wavelengths of 254 nm, 303 nm and 313 nm with high efficiency.

The metal halide lamp includes a light emitting tube filled with mercury and a metal halide. The metal halide lamp radiates light in a range as wide as 200 nm to 400 nm in wavelength, specifically ultraviolet rays and visible rays. The output of long-wavelength ultraviolet rays from the metal halide lamp is higher than that from the high-pressure mercury lamp.

If the ultraviolet curable paint is used as a luster coating material, a photopolymerizable monomer and a photopolymerizable oligomer that form a colorless transparent polymer (cured article) are used as those constituting the ultraviolet curable paint. The purpose is so that the base color of the object to be processed (specifically, the color of a coloring layer formed on the surface of the base substance of the object to be processed by using a coloring paint, i.e., the color of the underlayer) can be visually observed through the luster coating layer (a paint cured layer of the ultraviolet curable paint).

In fact, the object to be processed on which the luster coating layer is formed of the ultraviolet curable paint has the problem that the base color of the object to be processed (for example, the color of the coloring layer constituting the underlayer) is not visually observable but looks yellowed.

To be more specific, the photopolymerization initiator contained in the ultraviolet curable paint is certainly sensitive to light in an ultraviolet region. Many of such a photopolymerization initiator are also sensitive to light in a visual ray region (for example, see FIG. 2 of Patent Literature 2). That is, many photopolymerization initiators used in ultraviolet curable paints have a sensitivity wavelength region that covers shorter wavelength regions (specifically, indigo to blue regions) of the visible ray region on the longer wavelength side. FIG. 2 of Patent Literature 2 illustrates absorption spectrum distributions of certain types of photopolymerization initiators. Such an ultraviolet curable paints containing a photopolymerization initiator sensitive to light in the visible ray region has a characteristic that the photopolymerization initiator absorbs some of the light in the visible ray region even after cured. For example, if the luster coating layer is formed on an object to be processed on which a coloring layer is formed by using a white paint, the color of the object to be processed looks yellowish. In other words, the color of the underlayer of the object to be processed (white of the coloring layer) is not visually observable. Such a problem is not specific to the case where the base color of the object to be processed is white, but can also occur if the base color of the object to be processed is other than white.

To avoid such a problem, an ultraviolet curable paint containing a photopolymerization initiator not sensitive to the light in the visible ray region may be used as the luster coating material. More specifically, ultraviolet curable paints containing photopolymerization initiators having absorption spectrum distributions (sensitivity wavelength characteristics) such as illustrated by curves (A) to (C) of FIG. 5 may be used.

If such an ultraviolet curable paint is used as the luster coating material, the formed luster coating layer is prevented from absorbing some of the light in the visible ray region. The base color of the object to be processed (for example, the color of a coloring layer constituting the underlayer) on which the luster coating layer is stacked can thus be visually observed.

However, the use of an ultraviolet curable paint having such a sensitivity wavelength characteristic can cause a problem that the curing of the ultraviolet curable paint may become insufficient.

More specifically, as evident from FIG. 5, the high-pressure mercury lamp and the metal halide lamp conventionally used as the ultraviolet radiation unit have a characteristic that the light intensity is high in a region of not less than 300 nm in wavelength, greater than 350 nm in particular. In FIG. 5, a curve (a) indicates an emission spectrum distribution of the high-pressure mercury lamp. A curve (c) indicates an emission spectrum distribution of the metal halide lamp. The high-pressure mercury lamp has the highest light intensity at a peak wavelength of 365 nm. The metal halide lamp has the highest light intensity at a peak wavelength of longer than 360 nm.

As is evident from the curves (A) to (C) of FIG. 5, the photopolymerization initiators not sensitive to the light in the visible ray region have a sensitive wavelength characteristic (absorption spectrum distribution) that the sensitivity to light in a region of greater than 350 nm in wavelength is low.

The high-pressure mercury lamp and the metal halide lamp both radiate light in a region of not greater than 350 nm in wavelength where the photopolymerization initiators not sensitive to the light in the visible ray region have high sensitivity. However, the light intensity is small as compared to that of the light in the region of greater than 350 nm in wavelength.

If an ultraviolet curable paint containing a photopolymerization initiator having a sensitivity wavelength characteristic such as illustrated by the curves (A) to (C) of FIG. 5 is used to form the luster coating layer on the object to be processed, the ultraviolet curing reaction of the ultraviolet curable paint becomes slow. In some cases, the curing can be insufficient.

CITATION LIST

Patent Literature

Patent Literature 1: Japanese Patent Application Laid-Open No. 2001-340799

Patent Literature 2: Japanese Patent Application Laid-Open No. 2007-145930

SUMMARY OF INVENTION

Technical Problem

If an ultraviolet curable paint is used as a luster coating material, a photopolymerization initiator highly sensitive to light in a wavelength region where the high-pressure mercury lamp and the metal halide lamp provide high light intensity, specifically, light in the region of greater than 350 nm in wavelength has conventionally been used as that of the ultraviolet curable paint. For example, a photopolymerization initiator having a sensitivity characteristic such as illustrated in FIG. 2 of Patent Literature 2 has been adopted. Consequently, as described above, there is a problem that the base color of the object to be processed on which the luster coating layer is formed fails to be visually observed.

The present invention has been made in view of the foregoing circumstances and has as its object the provision of a curing process of an ultraviolet curable paint by which a paint cured layer can be formed on an object to be processed without needing a long time, and intended color can be obtained of the object to be processed on which the paint cured layer is formed.

Means for Solving the Problem

According to the present invention, there is provided a curing process of an ultraviolet curable paint for curing an ultraviolet curable paint through an ultraviolet irradiation step of irradiating a surface of an object to be processed to which the ultraviolet curable paint is applied with ultraviolet rays from an ultraviolet radiation unit, wherein: the ultraviolet curable paint is not sensitive to light of not less than 380 nm in wavelength but sensitive to light of less than 380 nm in wavelength; and the ultraviolet radiation unit radiates ultraviolet rays having a peak wavelength within a range of not greater than 350 nm in wavelength.

In the curing process of an ultraviolet curable paint, the object to be processed may preferably be heated and controlled in temperature to maintain a constant temperature in the ultraviolet irradiation step.

In the curing process of an ultraviolet curable paint, the object to be processed may preferably be maintained at a temperature lower than a glass transition temperature of a cured article obtained by irradiating the ultraviolet curable paint with the ultraviolet rays.

In the curing process of an ultraviolet curable paint, the ultraviolet radiation unit may preferably include a rare gas fluorescent lamp.

Advantageous Effects of Invention

According to the curing process of an ultraviolet curable paint of the present invention, an ultraviolet curable paint not sensitive to light of not less than 380 nm in wavelength but sensitive to light of less than 380 nm in wavelength is used, and an ultraviolet radiation unit radiating light having a peak wavelength within the range of not greater than 350 nm in wavelength is used. In the ultraviolet irradiation step, the light from the ultraviolet radiation unit can thus be used with high efficiency to develop a curing reaction of the ultraviolet curable paint without needing a long time. In addition, the resulting paint cured layer can be prevented from causing coloring (yellowing) due to absorption of visible rays.

According to the curing process of an ultraviolet curable paint of the present invention, the paint cured layer can thus be formed on the surface of the object to be processed without needing a long time, and intended color can be obtained of the object to be processed on which the paint cured layer is formed.

As a result, according to the curing process of an ultraviolet curable paint of the present invention, if an ultraviolet curable paint containing a photopolymerizable monomer and a photopolymerizable oligomer that form a colorless transparent polymer (cured article) is used, i.e., if the ultraviolet curable paint is used as a luster coating material, the base color of the object to be processed can be visually observed through the paint cured layer.

DESCRIPTION OF EMBODIMENTS

Figure 1:
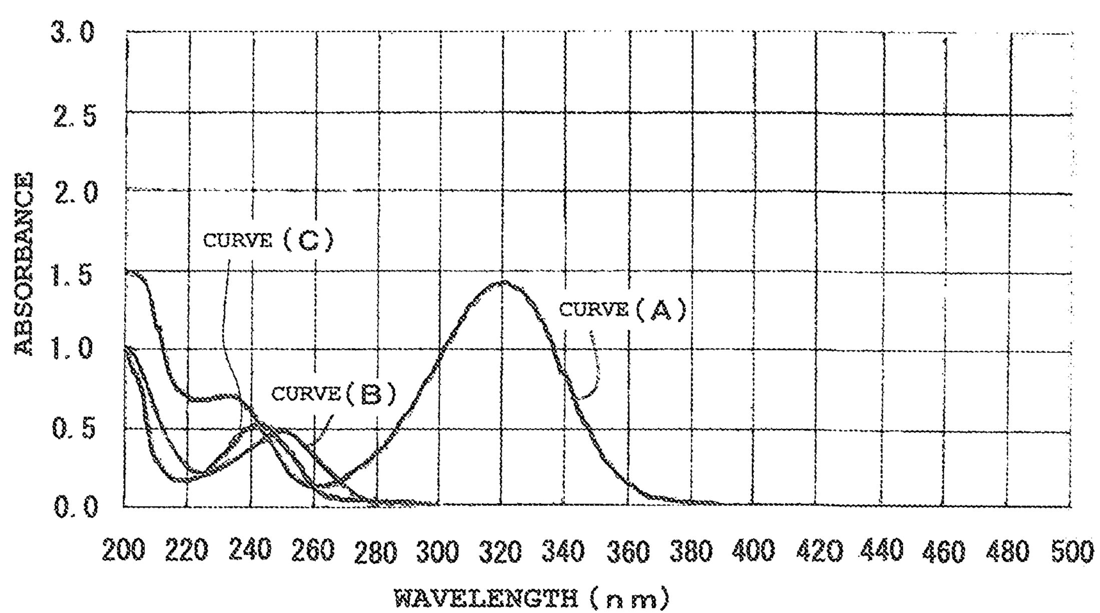
FIG. 1 is a graph illustrating absorption spectrum distributions of photopolymerization initiators constituting ultraviolet curable paints used in a curing process of an ultraviolet curable paint according to the present invention.

An embodiment of a curing process of an ultraviolet curable paint according to the present invention will be described below.

For example, the curing process of an ultraviolet curable paint according to the present invention is a process using an ultraviolet curable paint as a luster coating material (hard coat material). The process forms a paint cured layer of the ultraviolet curable paint, i.e., a luster coating layer (hard coat layer) on an object to be processed on which a coloring layer serving as an underlayer is formed if needed.

The object to be processed to which the curing process of an ultraviolet curable paint according to the present invention is applied may have any shape as long as the ultraviolet curable paint can be applied thereto. The base color of the object to be processed may be the color of its base substance made of, for example, a metal material, a resin material and the like. The base color of the object to be processed may be the color of a coloring layer formed on the surface of the base substance by using, for example, a coloring paint etc.

The curing process of an ultraviolet curable paint according to the present invention cures the ultraviolet curable paint through an ultraviolet irradiation step. The ultraviolet irradiation step includes irradiating the surface of the object to be processed to which the ultraviolet curable paint is applied with light (ultraviolet rays) from an ultraviolet radiation unit. The process is characterized in using an ultraviolet curable paint having a specific sensitivity characteristic and an ultraviolet radiation unit having a specific light emission characteristic.

In the curing process of an ultraviolet curable paint according to the present invention, the ultraviolet curable paint is not sensitive to light of not less than 380 nm in wavelength but sensitive to light of less than 380 nm in wavelength. In other words, the ultraviolet curable paint according to the present invention is not sensitive to visible rays but to ultraviolet rays.

That the ultraviolet curable paint is not sensitive to light of not less than 380 nm in wavelength but sensitive to light of less than 380 nm in wavelength prevents the resulting paint cured layer from causing coloring (yellowing) due to absorption of visible ways.

The transmittance of the cured article (paint cured layer) of the ultraviolet curable paint according to the present invention with respect to light having a wavelength of 380 nm is not lower than 95% that of the ultraviolet curable paint itself with respect to the light having a wavelength of 380 nm. In other words, the rate of decrease of the transmittance (post-curing transmittance) of the cured article of the ultraviolet curable paint with respect to the light having a wavelength of 380 nm to the transmittance (pre-curing transmittance) of the ultraviolet curable paint according to the present invention with respect to the light having a wavelength of 380 nm is not higher than 5%.

The ultraviolet curable paint according to the present invention contains a photopolymerization initiator, a polymerizable monomer and a polymerizable oligomer as main components contributing to the ultraviolet curing. The ultraviolet curable paint further contains a solvent if needed, and an additive or additives according to use purposes etc. As examples of the additives, may be mentioned an antioxidant and a light stabilizer. The antioxidant has a function of preventing the occurrence of thermal oxidation degradation. The light stabilizer has a function of scavenging radicals generated by ultraviolet rays, and exerts by that function an anti-coloring effect. If the ultraviolet curable paint according to the present invention is used as a luster coating material, a photopolymerizable monomer and a photopolymerizable oligomer that form a colorless transparent polymer (cured article) are typically used as those constituting the ultraviolet curable paint.

In the ultraviolet curable paint according to the present invention, the photopolymerization initiator absorbs the irradiating ultraviolet rays. The photopolymerization initiator is thereby activated to generate radicals or ions. The radicals or ions react with the polymerizable monomer and the polymerizable oligomer to cause a polymerization reaction (curing reaction) for ultraviolet curing. In other words, the use of the photopolymerization initiator having the sensitivity wavelength characteristic of not being sensitive to light of not less than 380 nm in wavelength but sensitive to light of less than 380 nm in wavelength gives the ultraviolet curable paint according to the present invention a specific sensitivity wavelength characteristic.

As specific examples of the ultraviolet curable paint according to the present invention, may be mentioned ones containing photopolymerization initiators having sensitivity wavelength characteristics illustrated in FIG. 1.

The photopolymerization initiator having a sensitivity wavelength characteristic illustrated by a curve (A) (hereinafter, also referred to as "photopolymerization initiator (A)") has a sensitivity peak within a range of 320 to 330 nm in wavelength. The photopolymerization initiator having a sensitivity wavelength characteristic illustrated by a curve (B) (hereinafter, also referred to as "photopolymerization initiator (B)") and the photopolymerization initiator having a sensitivity wavelength characteristic illustrated by a curve (C) (hereinafter, also referred to as "photopolymerization initiator (C)") both have a sensitivity peak within a range of not greater than 300 nm in wavelength. Specifically, the photopolymerization initiator (B) has a sensitivity peak within a range of 240 to 260 nm in wavelength. The photopolymerization initiator (C) has a sensitivity peak within a range of 230 to 250 nm in wavelength.

In the curing process of an ultraviolet curable paint according to the present invention, the ultraviolet radiation unit radiates light having a peak wavelength within an ultraviolet range of not greater than 350 nm in wavelength.

From the viewpoint of the use efficiency of the light from the ultraviolet radiation unit and the prevention of thermal degradation of the object to be processed and the paint cured layer, the ultraviolet radiation unit according to the present invention may preferably radiate only light in an ultraviolet region. The ultraviolet radiation unit may radiate light in a region other than the ultraviolet region if the light has a peak wavelength within the ultraviolet range of not greater than 350 nm in wavelength.

Since the ultraviolet radiation unit radiates light having a peak wavelength within the range of not greater than 350 nm in wavelength, the light from the ultraviolet radiation unit can be used with high efficiency to develop an ultraviolet curing reaction at practical speed in the ultraviolet irradiation step.

As is evident from an experimental example (specifically, experimental example 2), a temperature increase of the object to be processed in the ultraviolet irradiation step due to the irradiation with the light from the ultraviolet radiation unit can be reduced. This can prevent the occurrence of thermal degradation of the object to be processed itself and the paint cured layer due to the irradiation with the light from the ultraviolet radiation unit. In particular, as will be described later, if the object to be processed is heated and controlled in temperature to maintain a constant temperature in the ultraviolet irradiation step, the temperature control of the object to be processed is facilitated.

The ultraviolet radiation unit according to the present invention may preferably include a rare gas fluorescent lamp.

As employed herein, the rare gas fluorescent lamp includes, for example, a cylindrical light emitting tube that is made of a translucent dielectric material such as quartz glass and on both ends of which a sealing portion is formed. A rare gas such as xenon, argon or krypton is filled in the light emitting tube, and a phosphor layer is formed on the inner peripheral surface of the light emitting tube. A pair of external electrodes is arranged on the outer peripheral surface of the light emitting tube, at a distance from each other in a tube axis direction of the light emitting tube. If a high frequency voltage is applied to the pair of external electrodes, the rare gas fluorescent lamp causes a discharge between the pair of external electrodes with the dielectric (quartz-glass tube wall of the light emitting tube) therebetween. This results in the formation of rare gas excimer molecules in the light emitting tube, and excimer light is emitted when the rare gas excimer molecules transition to the ground state. The excimer light excites the phosphor constituting the phosphor layer. The phosphor layer generates ultraviolet rays, which are radiated outward from the light emitting tube.

Since the ultraviolet radiation unit according to the present invention includes the rare gas fluorescent lamp, the ultraviolet radiation unit can be configured to not radiate light other than ultraviolet rays. The ultraviolet radiation unit can also be configured to radiate intended light according to the type of the ultraviolet curable paint.

Specifically, the radiation light (emission spectrum distribution) of the rare gas fluorescent lamp can be controlled by appropriately selecting the type of the rare gas and the phosphor constituting the phosphor layer. The ultraviolet radiation unit according to the present invention can thus be configured to not radiate light other than ultraviolet rays, and to radiate light (ultraviolet rays) with high intensity in a wavelength region where the ultraviolet curable paint has sufficiently high sensitivity.

Since the ultraviolet radiation unit does not radiate light other than ultraviolet rays, the light from the ultraviolet radiation unit can be effectively used. This can reduce the process time of the ultraviolet irradiation step. Since the ultraviolet radiation unit does not radiate heat rays (infrared rays), the object to be processed itself and the resulting paint cured layer can be prevented from being irradiated with heat rays and overheated to cause thermal degradation. In particular, as will be described later, if the object to be processed is heated and controlled in temperature to maintain a constant temperature (set temperature) in the ultraviolet irradiation step, the temperature control of the object to be processed is facilitated.

Since the ultraviolet radiation unit radiates intended light according to the type of the ultraviolet curable paint, the light from the ultraviolet radiation unit can be used with even higher efficiency to develop the ultraviolet curing reaction at practical speed in the ultraviolet irradiation step. The paint cured layer can thus be formed without needing an extremely long time.

Figure 2:
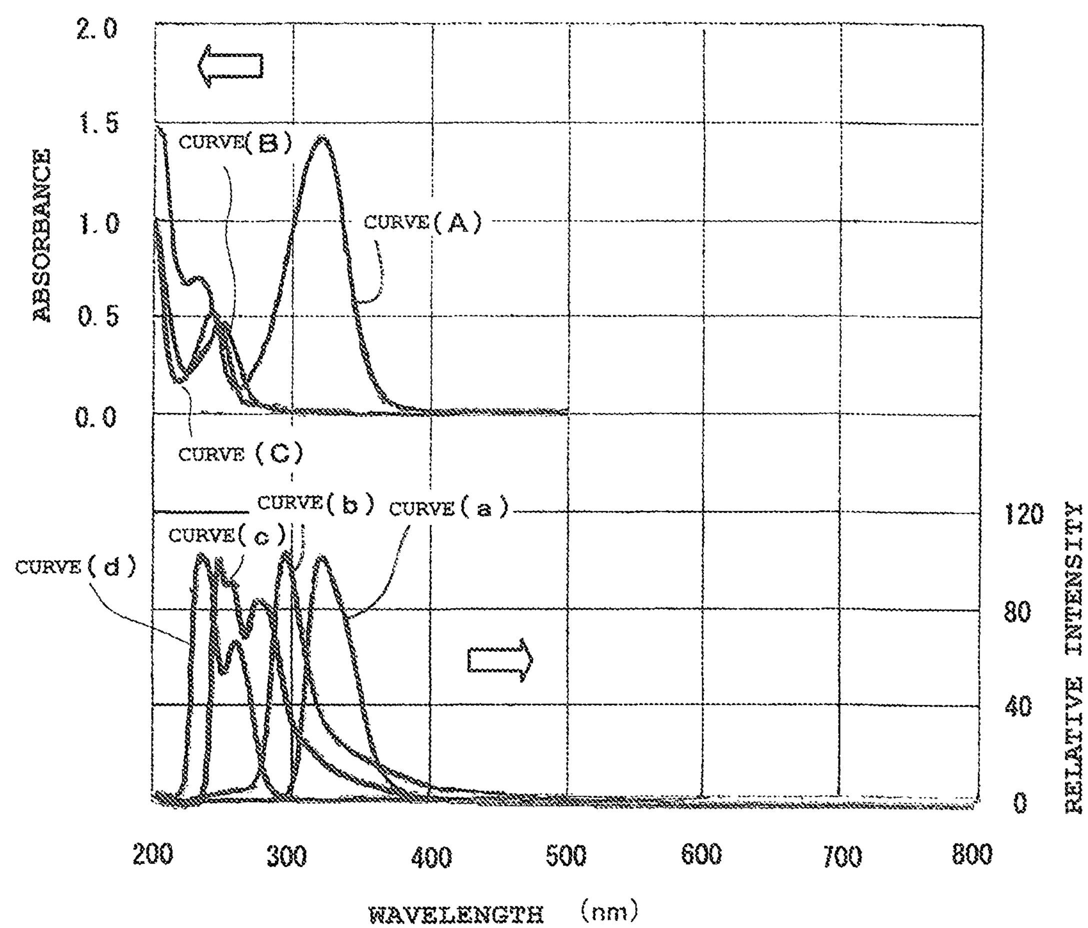
FIG. 2 is a graph illustrating emission spectrum distributions of rare gas fluorescent lamps used as an ultraviolet radiation unit in the curing process of an ultraviolet curable paint according to the present invention, along with the absorption spectrum distributions of the photopolymerization initiators illustrated in FIG. 1.

As specific examples of the rare gas fluorescent lamp constituting the ultraviolet radiation unit according to the present invention, may be mentioned ones that radiate light having emission spectrum distributions illustrated by curves (a) to (d) in FIG. 2.

The rare gas fluorescent lamp that radiates light having an emission spectrum distribution illustrated by the curve (a) (hereinafter, also referred to as "rare gas fluorescent lamp (a)") uses xenon as the rare gas. A cerium-activated lanthanum phosphate phosphor ($LaPO_4$:Ce) is used as the phosphor constituting the phosphor layer. The rare gas fluorescent lamp (a) radiates light having a peak wavelength near a wavelength of 320 nm. The rare gas fluorescent lamp that radiates light having an emission spectrum distribution illustrated by the curve (b) (hereinafter, also referred to as "rare gas fluorescent lamp (b)") uses xenon as the rare gas. A bismuth-activated yttrium aluminum borate phosphor ($YAl_3B_4O_{12}$:Bi) is used as the phosphor constituting the phosphor layer. The rare gas fluorescent lamp (b) radiates light having a peak wavelength near a wavelength of 290 nm. The rare gas fluorescent lamp that radiates light having an emission spectrum distribution illustrated by the curve (c) (hereinafter, also referred to as "rare gas fluorescent lamp (c)") uses xenon as the rare gas. A praseodymium-activated yttrium aluminum borate phosphor ($YAl_3B_4O_{12}$: Pr) is used as the phosphor constituting the phosphor layer. The rare gas fluorescent lamp (c) radiates light having a peak wavelength near a wavelength of 250 nm. The rare gas fluorescent lamp that radiates light having an emission spectrum distribution illustrated by the curve (d) (hereinafter, also referred to as "rare gas fluorescent lamp (d)") uses xenon as the rare gas. A praseodymium-activated lanthanum phosphate phosphor ($LaPO_4$:Pr) is used as the phosphor constituting the phosphor layer. The rare gas fluorescent lamp (d) radiates light having a peak wavelength near a wavelength of 230 nm.

The rare gas fluorescent lamps (a) to (d) are used as appropriate according to the type (sensitivity wavelength characteristic) of the ultraviolet curable paint.

Specifically, if an ultraviolet curable paint containing the photopolymerization initiator (A) is used, the rare gas fluorescent lamps (a) and (b) may preferably be used.

The reason is that the rare gas fluorescent lamp (a) radiates light having a peak wavelength within a range of 320 to 330 nm in wavelength where the photopolymerization initiator (A) has a sensitivity peak. The rare gas fluorescent lamp (b) does not radiate light having a peak wavelength within the range of 320 to 330 nm in wavelength where the photopolymerization initiator (A) has a sensitivity peak, whereas the photopolymerization initiator (A) has a sufficient sensitivity near 290 nm where the light radiated by the rare gas fluorescent lamp (b) has a peak wavelength.

If an ultraviolet curable paint containing the photopolymerization initiator (B) or one containing the photopolymerization initiator (C) is used, at least either one of the rare gas fluorescent lamps (c) and (d) may preferably be used.

The reason is that the photopolymerization initiators (B) and (C) both have sufficient sensitivity within a range of 200 to 300 nm in wavelength where the light radiated by the rare gas fluorescent lamps (c) and (d) has a peak wavelength.

In the curing process of an ultraviolet curable paint according to the present invention, the object to be processed may preferably be heated and controlled in temperature to maintain a constant temperature (set temperature) in the ultraviolet irradiation step. In other words, while ultraviolet irradiation is performed on the object to be processed in the ultraviolet irradiation step, the object to be processed may preferably be subjected to a heating treatment to maintain a constant temperature during the ultraviolet irradiation.

In the ultraviolet irradiation step, if the object to be processed is heated and controlled in temperature to maintain a constant temperature, the ultraviolet curable paint of the paint applied layer is sufficiently cured without an adverse effect that the object to be processed is overheated to cause thermal degradation of the object to be processed itself and the resulting paint cured layer. The resulting paint cured layer thus has abrasion resistance and weather resistance. In addition, the ultraviolet curing reaction occurring in the paint applied layer can be accelerated. The reason seems to be that the heating of the object to be processed causes a polymerization reaction (thermal curing reaction) by thermal action. In some cases, the polymerization reaction by the action of the ultraviolet rays and the polymerization reaction by the thermal action develop in a synergistic manner to promote the curing reaction of the ultraviolet curable paint. As a result, the time needed to cure the ultraviolet curable paint can be reduced.

Even if the paint cured layer to be formed has a large thickness of not less than 50 μm, the paint cured layer can be formed as intended.

More specifically, to form a paint cured layer having a large thickness, the paint applied layer of the ultraviolet curable paint needs to have a large thickness. If the paint applied layer has a large thickness, the light (ultraviolet rays) from the ultraviolet radiation unit according to the present invention may fail to reach the lowermost surface of the paint applied layer. That is, the ultraviolet rays with which the surface (uppermost surface) of the paint applied layer is irradiated are absorbed by the ultraviolet curable paint in the process of traveling toward the lowermost surface. All the ultraviolet rays may be absorbed up before reaching the lowermost surface. If the paint applied layer is simply irradiated with the light (ultraviolet rays) from the ultraviolet radiation unit according to the present invention, the curing of the ultraviolet curable paint may become insufficient in the deep portions of the paint applied layer where the ultraviolet rays do not reach. If the object to be processed is heated while being irradiated with the ultraviolet rays, there occurs the polymerization reaction by the thermal action (thermal curing reaction), whereby the ultraviolet curable paint can be sufficiently cured even in the deep portions not sufficiently irradiated with the ultraviolet rays.

Even if the object to be processed has such a shape as includes a portion difficult to be irradiated with the light (ultraviolet rays) from the ultraviolet radiation unit, an intended paint cured layer can also be formed. To be more specific, if the area to be processed of the object to be processed does not have a flat shape, the paint applied layer may fail to be sufficiently irradiated with the light (ultraviolet rays) from the ultraviolet radiation unit. In such a case, the curing of the ultraviolet curable paint becomes insufficient in some portions depending on the shape of the object to be processed. If the object to be processed is heated while being irradiated with the ultraviolet rays, there occurs the polymerization reaction by the thermal action (thermal curing reaction), whereby the ultraviolet curable paint can be sufficiently cured by the thermal curing reaction even in the portions not sufficiently irradiated with the ultraviolet rays.

In the ultraviolet irradiation step, the temperature of the object to be processed may preferably be lower than the glass transition temperature of the cured article of the ultraviolet curable paint used, i.e., lower than a temperature at which deformation or coloring of the resulting paint cured layer occurs.

Since the temperature of the object to be processed is maintained below the glass transition temperature of the cured article of the ultraviolet curable paint in the ultraviolet irradiation step, the resulting paint cured layer can be prevented from causing deformation or alteration (coloring).

The glass transition temperature of the cured article of the ultraviolet curable paint varies depending on the type of the ultraviolet curable paint (composition of the ultraviolet curable paint). Glass transition temperatures therefore need to be checked in advance by experiments and the like.

In such an ultraviolet irradiation step, the heating treatment of the object to be processed is performed by a heating mechanism that includes a heating unit arranged separate from the ultraviolet radiation unit.

For example, the heating mechanism includes the heating unit, a temperature measurement unit, and a control unit. As an example of the heating unit, may be mentioned a hot plate. The temperature measurement unit measures the temperature of the object to be processed. The control unit controls power supply to the heating unit so that the temperature of the object to be processed measured by the temperature measurement becomes a constant temperature (set temperature).

As specific examples of the curing process of an ultraviolet curable paint according to the present invention, may be mentioned a first curing process and a second curing process to be described below.

Which of the processes to use, the first curing process or the second curing process, is selected as appropriate according to the shape of the object to be processed, the thickness of the paint cured layer to be formed and the time available for the formation of the paint cured layer, in consideration of the type of the ultraviolet curable paint and the type of the ultraviolet radiation unit.

First Curing Process:

The first curing process includes the following four steps (1-1) to (1-4).

(1-1) An application step of applying an ultraviolet curable paint to the surface of an object to be processed.

(1-2) A preheating step of performing a preheating treatment on the surface of the object to be processed past the application step.

(1-3) An ultraviolet irradiation step of irradiating the surface of the object to be processed past the preheating step with ultraviolet rays from the ultraviolet radiation unit.

(1-4) A post-heating step of performing a post-heating treatment on the object to be processed past the ultraviolet irradiation step.

In the first curing process, an object to be processed and an ultraviolet curable paint according to the present invention, i.e., an ultraviolet curable paint not sensitive to light of not less than 380 nm in wavelength but sensitive to light of less than 380 nm in wavelength are initially prepared. The glass transition temperature of a cured article of the prepared ultraviolet curable paint is then checked.

For the ultraviolet radiation unit according to the present invention, one having a light emission characteristic (emission spectrum distribution) according to the sensitivity wavelength characteristic (absorption spectrum distribution) of the prepared ultraviolet curable paint is prepared.

(Application Step)

In the application step, a paint applied layer is formed by applying the ultraviolet curable paint to the entire area where to form the paint cured layer on the surface of the object to be processed.

In this application step, the amount of application of the ultraviolet curable paint is appropriately determined according to the thickness of the paint cured layer to be formed, the type of the ultraviolet curable paint and the like.

(Preheating Step (Prebaking Step))

In the preheating step, a preheating treatment for heating the surface of the object to be processed on which the paint applied layer is formed in the application step is performed under an air atmosphere.

Through the preheating step, if the ultraviolet curable paint constituting the paint applied layer contains a solvent, the solvent contained in the ultraviolet curable paint is evaporated from the paint applied layer. That is, in the preheating step, a solvent removal treatment is performed on the paint applied layer.

The heating condition of the surface (paint applied layer) of the object to be processed in the preheating step is appropriately set according to the type of the constituent materials of the object to be processed, the type of the ultraviolet curable paint, the thickness of the paint applied layer and the like.

A specific heating condition may include a heating temperature of 80° C. and a heating time of 10 minutes.

(Ultraviolet Irradiation Step)

In the ultraviolet irradiation step, the surface of the object to be processed on which the paint applied layer is formed and that is heated in the preheating step is irradiated with the light (ultraviolet rays) from the ultraviolet radiation unit under the air atmosphere.

Through the ultraviolet irradiation step, the ultraviolet curable paint in the paint applied layer on which the solvent removal processing has been performed is cured to form a paint cured layer of the ultraviolet curable paint. That is, in the ultraviolet irradiation step, a curing treatment of the ultraviolet curable paint is performed.

In the ultraviolet irradiation step, the surface (paint applied layer) of the object to be processed is irradiated with ultraviolet rays of, for example, 42 $mW/cm^2$ in illuminance.

The irradiation time of the surface of the object to be processed with the ultraviolet rays is appropriately set according to the type of the ultraviolet curable paint, the thickness of the paint applied layer, the type of the ultraviolet radiation unit and the like. For example, the irradiation time is 8.5 minutes.

(Post-Heating Step (After-Baking Step))

In the post-heating step, a post-heating treatment for heating the surface of the object to be processed on which the paint cured layer is formed in the ultraviolet irradiation step is performed under the air atmosphere.

Through the post-heating step, the paint cured layer is hardened so that the paint cured layer has sufficient abrasion resistance and weather resistance needed for practical use. In the post-heating step, the paint cured layer is brought to a state where three-dimensional polymer networks of two or more components are intricately intertwined with each other.

The heating condition of the surface (paint cured layer) of the object to be processed in the post-heating step is appropriately set according to the type of the constituent materials of the object to be processed, the type of the ultraviolet curable paint, the thickness of the paint cured layer and the like. As described above, the heating condition may preferably include a temperature lower than the glass transition temperature of the ultraviolet curable paint, i.e., lower than a temperature at which deformation or alteration of the resulting paint cured layer occurs.

A specific heating condition may include a heating temperature of 100° C. and a heating time of 10 minutes.

Second Curing Process:

The second curing process includes the same steps as those of the first curing process except that the ultraviolet irradiation step of the first curing process is modified to heat the object to be processed past the preheating step while irradiating the object to be processed with the ultraviolet rays from the ultraviolet radiation unit. More specifically, the second curing process includes the following steps (2-1) to (2-3).

(2-1) An application step of applying an ultraviolet curable paint to the surface of an object to be processed.

(2-2) A preheating step of performing a preheating treatment on the surface of the object to be processed past the application step.

(2-3) An ultraviolet irradiation step of performing a heating treatment on the surface of the object to be processed past the preheating step while irradiating the surface of the object to be processed with ultraviolet rays from the ultraviolet radiation unit.

In the second curing process, like the first curing process, an object to be processed and an ultraviolet curable paint according to the present invention, i.e., an ultraviolet curable paint not sensitive to light of not less than 380 nm in wavelength but sensitive to light of less than 380 nm in wavelength are initially prepared. The glass transition temperature of a cured article of the prepared ultraviolet curable paint is then checked.

For the ultraviolet radiation unit according to the present invention, one having a light emission characteristic (emission spectrum distribution) according to the sensitivity wavelength characteristic (absorption spectrum distribution) of the prepared ultraviolet curable paint is prepared.

(Application Step)

In the application step, a paint applied layer is formed by applying the ultraviolet curable paint to the entire area where to form the paint cured layer on the surface of the object to be processed.

In this application step, the amount of application of the ultraviolet curable paint is appropriately determined according to the thickness of the paint cured layer to be formed, the type of the ultraviolet curable paint and the like.

(Preheating Step (Pre-Baking Step))

In the preheating step, a preheating treatment for heating the surface of the object to be processed on which the paint applied layer is formed in the application step is performed under an air atmosphere.

Through the preheating step, if the ultraviolet curable paint constituting the paint applied layer contains a solvent, the solvent contained in the ultraviolet curable paint is evaporated from the paint applied layer. That is, in the preheating step, a solvent removal treatment is performed on the paint applied layer.

The heating condition of the surface (paint applied layer) of the object to be processed in the preheating step is appropriately set according to the constituent materials of the object to be processed, the type of the ultraviolet curable paint, the thickness of the paint applied layer and the like.

A specific heating condition may include a heating temperature of 80° C. and a heating time of 10 minutes.

(Ultraviolet Irradiation Step)

In the ultraviolet irradiation step, the surface of the object to be processed on which the paint applied layer of the ultraviolet curable paint is formed and that is heated in the preheating step is irradiated with the light (ultraviolet rays) from the ultraviolet radiation unit under an air atmosphere. At the same time, a heating treatment is performed on the surface of the object to be processed. During the heating treatment, the temperature of the object to be processed is controlled to maintain a contact temperature (specifically, for example, a temperature lower than the glass transition temperature of the cured article of the ultraviolet curable paint).

Through the ultraviolet irradiation step, the ultraviolet curable paint in the paint applied layer on which the solvent removal treatment has been performed is cured to forma paint cured layer of the ultraviolet curable paint. The paint cured layer is hardened to have sufficient abrasion resistance and weather resistance needed for practical use. That is, a curing treatment of the ultraviolet curable paint and a hardening treatment of the paint cured layer are performed in the ultraviolet irradiation step.

In the ultraviolet irradiation step, the surface (paint applied layer) of the object to be processed is irradiated with ultraviolet rays of, for example, 42 $mW/cm^2$ in illuminance.

In the ultraviolet irradiation step, the temperature (set temperature) of the surface (paint applied layer) of the object to be processed, i.e., the heating temperature of the surface (paint applied layer) of the object to be processed is appropriately set according to the type of the constituent materials of the object to be processed, the type of the ultraviolet curable paint and the like. As described above, the heating temperature may preferably be lower than the glass transition temperature of the ultraviolet curable paint, i.e., lower than a temperature at which deformation or alteration (coloring) of the resulting paint cured layer occurs.

The time needed for the ultraviolet irradiation step, specifically, the ultraviolet irradiation time and heating time of the surface (paint applied layer) of the object to be processed are appropriately set according to the constituent materials of the object to be processed, the type of the ultraviolet curable paint, the thickness of the paint applied layer of the ultraviolet curable paint, the type of the ultraviolet radiation unit and the like. For example, the needed time is 5 minutes.

In such a curing process of an ultraviolet curable paint according to the present invention, an ultraviolet curable paint not sensitive to light of not less than 380 nm in wavelength but sensitive to light of less than 380 nm in wavelength is used, and an ultraviolet radiation unit radiating light having a peak wavelength within the range of not greater than 350 nm in wavelength is used. In the ultraviolet irradiation step, the light from the ultraviolet radiation unit can thus be used with high efficiency to develop an ultraviolet curing reaction of the ultraviolet curable paint at practical speed. The resulting paint cured layer can be prevented from causing coloring (yellowing) due to the absorption of visible rays.

According to the curing process of an ultraviolet curable paint of the present invention, the paint cured layer can thus be formed on the surface of the object to be processed without needing a longtime. The object to be processed on which the paint cured layer is formed can provide intended color.

As a result, according to the curing process of an ultraviolet curable paint of the present invention, if an ultraviolet curable paint containing a photopolymerizable monomer and a photopolymerizable oligomer that form a colorless transparent polymer (cured article) is used, i.e., if the ultraviolet curable paint is used as a luster coating material, the base color of the object to be processed can be visually observed through the paint cured layer. The curing process of an ultraviolet curable paint according to the present invention can thus be suitably used to form a luster coating layer on a vehicle body of an automobile, a motorcycle and the like.

In the curing process of an ultraviolet curable paint according to the present invention, the temperature of the object to be processed is maintained to be lower than the glass transition temperature of the cured article of the ultraviolet curable paint in the ultraviolet irradiation step. This can prevent the occurrence of deformation and alteration (coloring) of the resulting paint cured layer.

In the curing process of an ultraviolet curable paint according to the present invention, the ultraviolet radiation unit includes a rare gas fluorescent lamp. The ultraviolet radiation unit can thus be configured to not radiate light other than ultraviolet rays and even to radiate intended light according to the type (sensitivity wavelength characteristic) of the ultraviolet curable paint. In the ultraviolet irradiation step, the light from the ultraviolet radiation unit can thus be effectively used. This can consequently reduce the time needed for the curing of the ultraviolet curable paint.

The curing process of an ultraviolet curable paint according to the present invention can be carried out by an apparatus or the like that includes an ultraviolet radiation unit and a heating mechanism including a heating unit arranged separate from the ultraviolet radiation unit.

Figure 3:
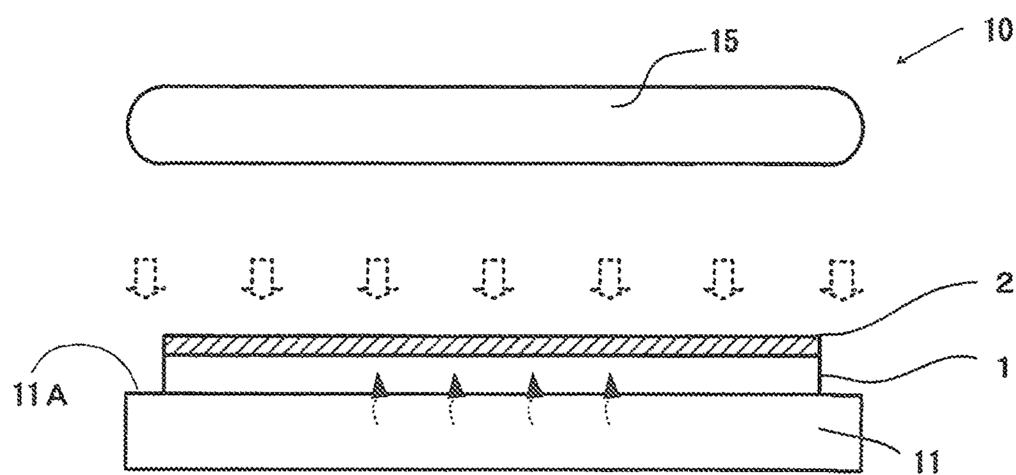
FIG. 3 is an explanatory diagram illustrating an example of a configuration of a curing apparatus for carrying out the curing process of an ultraviolet curable paint according to the present invention, along with an object to be processed on the surface of which a paint applied layer is formed.

FIG. 3 is an explanatory diagram illustrating an example of a configuration of a curing apparatus for carrying out the curing process of an ultraviolet curable paint according to the present invention, along with an object to be processed on the surface of which a paint applied layer of the ultraviolet curable paint is formed.

This curing apparatus 10 can perform both the first curing process and the second curing process described above.

The curing apparatus 10 includes a stage 11 and an ultraviolet radiation unit 15. An object to be processed 1 on the surface of which a paint applied layer 2 is formed is placed on the stage 11. The ultraviolet radiation unit 15 is arranged opposite to and at a distance from an object-to-be-processed placement surface 11A of the stage 11.

The stage 11 includes a heating mechanism (not illustrated) for heating the object to be processed 1 placed on the object-to-be-processed placement surface 11A. The heating mechanism includes a heating unit, a temperature measurement unit, and a control unit. The heating unit is embedded in the stage 11. The temperature measurement unit is intended to measure the temperature of the object to be processed 1 placed on the object-to-be-processed placement surface 11A. The control unit supplies power to the heating unit on the basis of the temperature of the object to be processed 1 (specifically, the temperature of the surface (paint applied layer 2) of the object to be processed 1) measured by the temperature measurement unit. In the heating mechanism, the control unit controls the power supply to the heating unit so that the temperature of the object to be processed 1 measured by the temperature measurement unit becomes a predetermined temperature (set temperature).

In the example of the diagram, a heater including a heating wire is used as the heating unit constituting the heating mechanism.

The ultraviolet radiation unit 15 includes a rod-shaped lamp radiating light having a peak wavelength within a range of not greater than 350 nm in wavelength.

In the example of the diagram, a rare gas fluorescent lamp is used as the ultraviolet radiation unit 15.

In such a curing apparatus 10, the object to be processed 1 on the surface of which the paint applied layer 2 of the ultraviolet curable paint according to the present invention is formed is placed on the object-to-be-processed placement surface 11A so that the paint applied layer 2 is opposed to the ultraviolet radiation unit 15. For example, the separation distance (irradiation distance) between the object to be processed 1 and the ultraviolet radiation unit 15 is 10 mm. Power is initially supplied to the heating unit via the control unit to perform a heating treatment on the object to be processed 1 (paint applied layer 2) placed on the object-to-be-processed placement surface 11A under a predetermined condition. The power supply to the heating unit is then stopped if needed. The ultraviolet radiation unit 15 is then turned on to irradiate the object to be processed 1 (paint applied layer 2) with ultraviolet rays under a predetermined condition. If power is supplied to the heating unit to heat the object to be processed 1 during the ultraviolet irradiation, the power supply to the heating unit is controlled by the control unit. The object to be processed 1 (paint applied layer 2) is thereby maintained at a constant temperature. If the ultraviolet irradiation of the object to be processed 1 (paint applied layer 2) is performed without heating the object to be processed 1, power is supplied to the heating unit via the control unit after the ultraviolet radiation unit 15 is turned off. A heating treatment is thereby performed on the object to be processed 1 (paint applied layer 2) under a predetermined heating condition.

In such a manner, a paint cured layer having sufficient abrasion resistance and weather resistance needed for practical use is formed on the object to be processed 1.

The curing process of an ultraviolet curable paint according to the present invention is not limited to the foregoing embodiment, and various modifications may be made thereto.

For example, the curing apparatus for carrying out the curing process of an ultraviolet curable paint according to the present invention may use a heating mechanism that is configured to supply hot air to the space where the object to be processed is to increase the temperature of the entire atmosphere and thereby warm the object to be processed. In other words, a heating mechanism configured to warm the object to be processed by hot air may be used. Alternatively, a heating mechanism configured to warm the object to be processed by using a halogen heater or the like, i.e., one configured to warm the object to be processed by far infrared rays may be used.

Experimental examples of the present invention will be described below.

Experimental Example 1

Experimental Curing Apparatus

Figure 4:
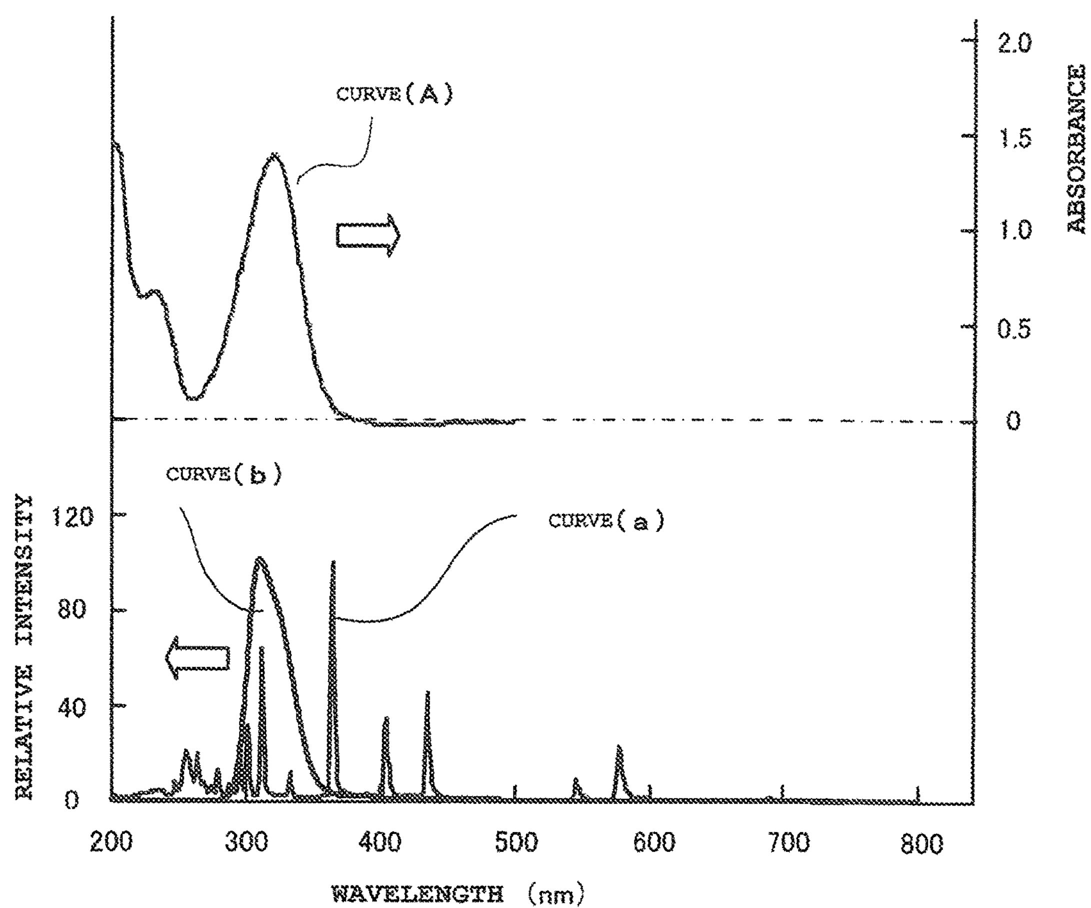
FIG. 4 is a graph illustrating an absorption spectrum distribution of a photopolymerization initiator constituting an ultraviolet curable paint used in an experimental example and emission spectrum distributions of a rare gas fluorescent lamp and a high-pressure mercury lamp used in the experimental example.
Figure 5:
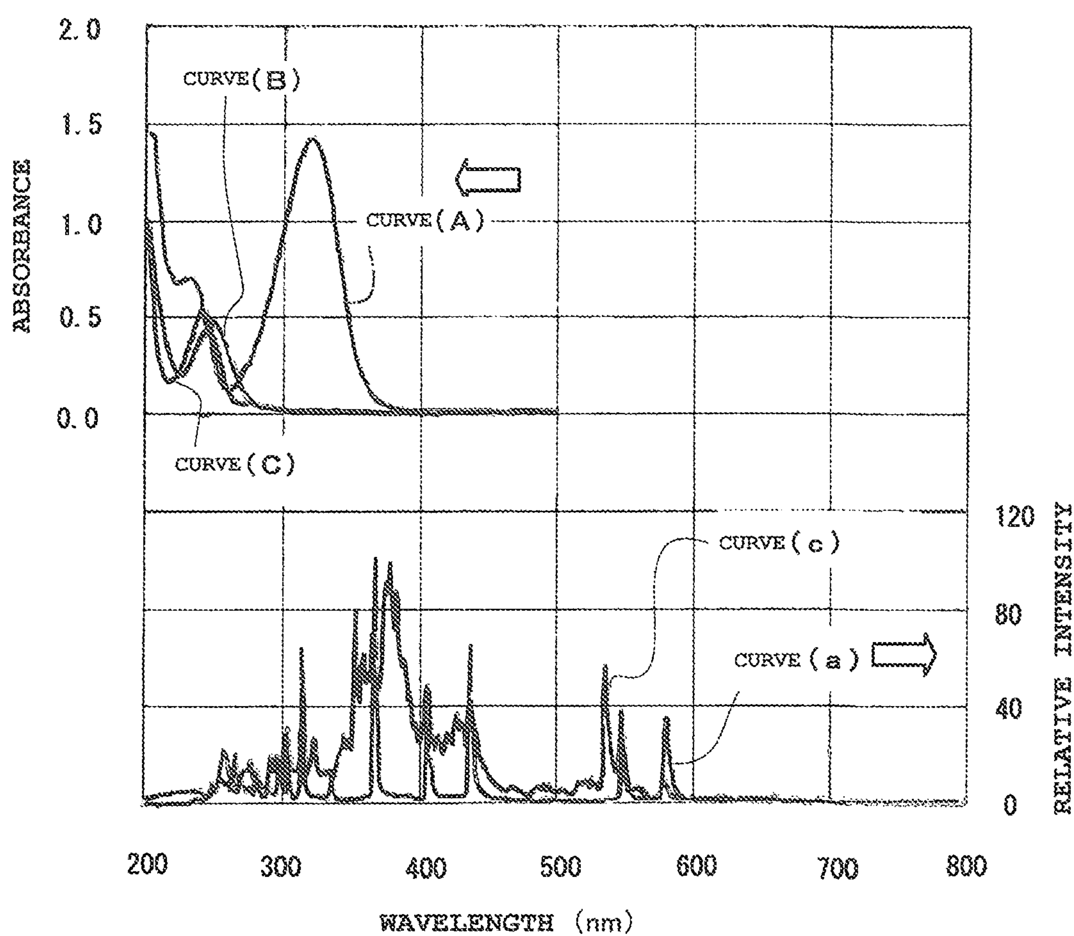
FIG. 5 is a graph illustrating absorption spectrum distributions of photopolymerization initiators constituting ultraviolet curable paints used in a curing process of an ultraviolet curable paint and emission spectrum distributions of a high-pressure mercury lamp and a metal halide lamp used as an ultraviolet radiation unit in a conventional curing process of an ultraviolet curable paint.

An experimental curing apparatus (hereinafter, also referred to as "curing apparatus (A)") including a high-pressure mercury lamp having an emission spectrum distribution illustrated by the curve (a) of FIG. 4 as the ultraviolet radiation unit (15) was fabricated on the basis of FIG. 3.

This curing apparatus (A) includes a cold filter for cutting off heat rays (infrared rays). The cold filter is arranged between the ultraviolet radiation unit (15) and the stage (11) so that the object to be processed (1) is not irradiated with heat rays (infrared rays) from the high-pressure mercury lamp.

The stage (11) of the curing apparatus (A) has an object-to-be-processed placement surface (11A) having length and width dimensions such that an object to be processed (1) of rectangular flat shape having dimensions of 50 mm×50 mm in length and width can be placed thereon.

(Ultraviolet Curable Paint)

An ultraviolet curable paint (hereinafter, also referred to as "paint (1)") containing a photopolymerization initiator having an absorption spectrum distribution (sensitivity wavelength characteristic) illustrated in FIG. 2 of Patent Literature 2 and an ultraviolet curable paint (hereinafter, also referred to as "paint (2)") containing a photopolymerization initiator having an absorption spectrum distribution (sensitivity wavelength characteristic) illustrated by the curve (A) of FIG. 4 were prepared.

The paints (1) and (2) both contain a photopolymerizable monomer and a photopolymerizable oligomer that form a colorless transparent polymer (cured article).

(Color Check of Object to be Processed Visually Observed Through Paint Cured Layer of Ultraviolet Curable Paint)

Initially, a white paint was applied to the surface of cold rolled steel plates of 50 mm (length)×50 mm (width)×1.6 mm (thickness) to form a white layer. The paints (1) and (2) were applied onto the white layers of the respective objects to be processed to form a 50-μm-thick paint applied layer each.

The object to be processed on which the paint applied layer of the paint (1) was formed and the object to be processed on which the paint applied layer of the paint (2) was formed were each placed on the object-to-be-processed placement surface of the curing apparatus (A) so that the paint applied layer was opposed to the ultraviolet radiation unit. The preheating treatment was performed under a heating condition including a heating temperature of 80° C. and a heating time of 10 minutes (preheating step).

The ultraviolet radiation unit was then turned on to irradiate the surface of each object to be processed with the light from the ultraviolet radiation unit under an irradiation condition including an irradiation distance (separation distance between the object to be processed and the ultraviolet radiation unit) of 100 mm and an irradiation time of 5 minutes (ultraviolet irradiation step).

The post-heating treatment was then performed on each object to be processed under a heating condition including a heating temperature of 100° C. and a heating time of 10 minutes (post-heating step).

By such a curing procedure through the preheating step, the ultraviolet irradiation step and the post-heating step, a laminate (hereinafter, also referred to as "laminate (1-1)") having a paint cured layer of the paint (1) formed on the white layer of the object to be processed and a laminate (hereinafter, also referred to as "laminate (1-2)") having a paint cured layer of the paint (2) formed on the white layer of the object to be processed were obtained.

The obtained laminates (1-1) and (1-2) were each visually observed to check the color of the object to be processed through the paint cured layer. The laminate (1-1) was yellowish white. The laminate (1-2) was white.

(Checking Transmittance of Light Having Wavelength of 380 nm Before and After Curing of Ultraviolet Curable Paint)

Initially, the paints (1) and (2) were each applied to the surface of an object to be processed made of a transparent substrate to form a 50-μm-thick paint applied layer of the ultraviolet curable paint. The transmittance (hereinafter, also referred to as "pre-curing transmittance") of the resulting object to be processed on which the paint applied layer of the paint (1) was formed and that of the object to be processed on which the paint applied layer of the paint (2) was formed were each measured with respect to light having a wavelength of 380 nm.

Then, the object to be processed on which the paint applied layer of the paint (1) was formed and the object to be processed on which the paint applied layer of the paint (2) was formed were each placed on the object-to-be-processed placement surface (11A) of the curing apparatus (A). Through the foregoing curing procedure, a laminate (hereinafter, also referred to as "laminate (1-3)") having a paint cured layer of the paint (1) formed on the object to be processed and a laminate (hereinafter, also referred to as "laminate (1-4)") having a paint cured layer of the paint (2) formed on the object to be processed were obtained.

The transmittance of each of the obtained laminates (1-3) and (1-4) with respect to the light having a wavelength of 380 nm was measured to check the rate of decrease from the pre-curing transmittance. The ratio of decrease of the laminate (1-3) was higher than 5%. The ratio of decrease of the laminate (1-4) was not higher than 5%.

From the result of this experimental example 1, it is evident that an ultraviolet curable paint not sensitive to light of not less than 380 nm in wavelength but sensitive to light of less than 380 nm in wavelength can be used to prevent the occurrence of coloring (yellowing) of the resulting paint cured layer.

It is also evident that if an ultraviolet curable paint not sensitive to light of not less than 380 nm in wavelength but sensitive to light of less than 380 nm in wavelength is used, the rate of decrease of the transmittance (transmittance after curing) of the cured article of the ultraviolet curable paint with respect to light having a wavelength of 380 nm from the transmittance (transmittance before curing) of the ultraviolet curable paint with respect to the light having a wavelength of 380 nm is not higher than 5%.

If the ultraviolet curable paint sensitive to light of not less than 380 nm in wavelength was used, the resulting paint cured layer caused coloring (yellowing).

Experimental Example 2

Experimental Curing Apparatus

The curing apparatus (A) fabricated in experimental example 1 was prepared.

Another experimental curing apparatus (hereinafter, also referred to as "curing apparatus (B)") was fabricated as in experimental example 1 except that the ultraviolet radiation unit in the fabrication example of the experimental curing apparatus of experimental example 1 was replaced with a rare gas fluorescent lamp having an emission spectrum distribution illustrated by the curve (b) of FIG. 4 and that no cold filter was included. That is, the curing apparatus (B) was fabricated according to FIG. 3.

(Color Check of Object to be Processed Visually Observed Through Paint Cured Layer of Ultraviolet Curable Paint)

Initially, a white paint was applied to the surface of cold rolled steel plates of 50 mm (length)×50 mm (width)×1.6 mm (thickness) to prepare two objects to be processed having a white layer formed thereon. The paint (2) was applied to the white layer of each object to be processed to form a 50-μm-thick paint applied layer.

The objects to be processed having the paint applied layer of the paint (2) formed thereon were placed on the object-to-be-processed placement surfaces (11A) of the respective curing apparatuses (A) and (B) so that the paint applied layer was opposed to the ultraviolet radiation unit. Through the same curing procedure as in experimental example 1, laminates (hereinafter, also referred to as a "laminate (2-1)" and a "laminate (2-2)") having a paint cured layer of the paint (2) formed on the respective objects to be processed were obtained. The laminate (2-1) was the one fabricated by using the curing apparatus (A) including the high-pressure mercury lamp as the ultraviolet radiation unit. The laminate (2-2) is the one fabricated by using the curing apparatus (B) including the rare gas fluorescent lamp as the ultraviolet radiation unit.

The obtained laminates (2-1) and (2-2) were each visually observed to check the color of the object to be processed through the paint cured layer. Both the laminates (2-1) and (2-2) were white.

(Checking Light Use Efficiency of Curing Apparatus)

For each of the curing apparatuses (A) and (B), the illuminance (specifically, the illuminance of light within a range of 300 to 360 nm in wavelength) on the surface of the object to be processed (the surface of the paint applied layer) and the irradiance (specifically, the irradiance of light in ultraviolet to infrared regions) of the ultraviolet radiation unit were measured. On the basis of the obtained measurements, a light use efficiency was calculated by the following equation (1). Table 1 shows the results.

Light use efficiency (%)=(the illuminance on the surface of the object to be processed [mW/cm$^2$])/(the irradiance of the ultraviolet radiation unit [mW/cm$^2$])×100 Eq. 1:

(Checking Degree of Temperature Increase of Object to be Processed by Light from Ultraviolet Radiation Unit)

The high-pressure mercury lamp constituting the curing apparatus (A) and the rare gas fluorescent lamp constituting the curing apparatus (B) were each used to perform light irradiation on a 100-μm-thick polyethylene terephthalate (PET) film conveyed at a speed of 5 m/min. The temperature of the PET film was measured before and after the light irradiation under conditions including an irradiation distance of 300 mm for the curing apparatus (A) and an irradiation distance of 10 mm for the curing apparatus (B). On the basis of the obtain measurements, the temperature increased by the light irradiation (increased temperature) was calculated. Table 1 shows the results.

TABLE 1

| | CURING APPARATUS(A) | CURING APPARATUS(B) |
|---|---|---|
| ULTRAVIOLET RADIATION UNIT | HIGH-PRESSURE MERCURY LAMP | RARE GAS FLUORESCENT LAMP |
| PRESENCE OF COLD FILTER | YES | NO |
| ILLUMINANCE AT SURFACE | 43 | 42 |

TABLE 1-continued

| | CURING APPARATUS(A) | CURING APPARATUS(B) |
|---|---|---|
| OF OBJECT TO BE PROCESSED (mW/cm²) | | |
| IRRADIANCE OF ULTRAVIOLET RADIATION UNIT (mW/cm²) | 967 | 200 |
| LIGHT USE EFFICIENCY (%) | 4.4 | 21 |
| INCREASED TEMPERATURE OF PET FILM (° C.) | 27.4 | 6 |

From the result of this experimental example 2, it is evident that an ultraviolet radiation unit (rare gas fluorescent lamp) radiating light having a peak wavelength within the range of not greater than 350 nm in wavelength can be used to effectively use the light from the ultraviolet radiation unit and prevent the occurrence of coloring (yellowing) of the resulting paint cured layer.

If an ultraviolet radiation unit radiating light having a peak wavelength in the range of greater than 350 nm in wavelength is used, the occurrence of coloring (yellowing) of the resulting paint cured layer can be prevented. However, the light from the ultraviolet radiation unit is not effectively used. It is also evident that the temperature of the object to be processed increases during the light irradiation even if the cold filter is used to cut off heat rays (infrared rays).

Specifically, from the observations of the light use efficiencies of the curing apparatuses, the curing apparatus (B) has a light use efficiency of 21%. The curing apparatus (A) has a light use efficiency of 4.4%. It is evident that if the lamp (rare gas fluorescent lamp) radiating light having a peak wavelength in the region of not greater than 350 nm in wavelength is used as the ultraviolet radiation unit, the light from the ultraviolet radiation unit can be more effectively used to cure the ultraviolet curable paint than when the lamp (high-pressure mercury lamp) radiating light having a peak wavelength in the region of greater than 350 nm in wavelength is used.

From the observations of the degrees of temperature increase of the object to be processed by the light from the ultraviolet radiation units, an increased temperature due to the irradiation with the light from the rare gas fluorescent lamp from the curing apparatus (B) is 6° C. An increased temperature due to the irradiation with the light from the high-pressure mercury lamp of the curing apparatus (A) is 27.4° C. It is evident that if the lamp (rare gas fluorescent lamp) radiating light having a peak wavelength in the region of not greater than 350 nm in wavelength is used as the ultraviolet radiation unit, the temperature increase of the object to be processed can be suppressed as compared to when the lamp (high-pressure mercury lamp) radiating light having a peak wavelength in the region of greater than 350 nm in wavelength is used.

Experimental Example 3

Initially, a white paint was applied to the surface of cold rolled steel plates of 50 mm (length)×50 mm (width)×1.6 mm (thickness) to prepare a plurality of objects to be processed having a white layer formed thereon. The paint (2) was applied to the white layer of each object to be processed to form a 50 μm-thick paint applied layer.

Each object to be processed on which the paint applied layer of the paint (2) was formed was placed on the object-to-be-processed placement surface (11A) of the curing apparatus (B) so that the paint applied layer was opposed to the ultraviolet radiation unit. The preheating treatment was performed under a heating condition including a heating temperature of 80° C. and a heating time of 10 minutes (preheating step).

The object to be processed was then heated to maintain a temperature of 100° C. while the ultraviolet radiation unit was turned on to irradiate the object to be processed with the light from the ultraviolet radiation unit under an irradiation condition including an irradiation time of 8.5 minutes (ultraviolet irradiation step).

In such a manner, by a curing procedure through the preheating step and the ultraviolet irradiation step, laminates (hereinafter, also referred to as "laminates (3)") each having a paint cured layer of the paint (2) formed on the white layer of the object to be processed were obtained.

Each laminate (3) was visually observed to check the color of the object to be processed through the paint cured layer, and found to be white.

The paint cured layer of the laminate (3) was also found to have a cured state and quality equivalent to those of the laminate (2-2).

Table 2 below shows the result of this experimental example 3. As is evident from a comparison between the laminate (3) according to this experimental example 3 and the laminate (2-2) according to the foregoing experimental example 2, the heating treatment of the object to be processed in the ultraviolet irradiation step can reduce the time needed to cure the ultraviolet curable paint.

TABLE 2

| | PROCESSING TIME(min) | | | | ULTRAVIOLET IRRADIATION STEP | |
|---|---|---|---|---|---|---|
| | PRE-HEATING STEP | ULTRAVIOLET IRRADIATION STEP | POST-HEATING STEP | TOTAL | ULTRAVIOLET RADIATION UNIT | PRESENCE OF HEATING TREATMENT |
| LAMINATE (2-2) | 10 | 5 | 10 | 25 | RARE GAS FLUORESCENT LAMP | NO |
| LAMINATE (3) | 10 | 8.5 | 0 | 18.5 | RARE GAS FLUORESCENT LAMP | YES |

REFERENCE SIGNS LIST

1 object to be processed
2 paint applied layer
10 curing apparatus
11 stage
11A object-to-be-processed placement surface
15 ultraviolet radiation unit

The invention claimed is:

1. A curing process for curing an ultraviolet curable paint, the curing process comprising an ultraviolet irradiation step of irradiating a surface of an object to be processed to which the ultraviolet curable paint is applied with ultraviolet rays from an ultraviolet radiation unit to obtain a paint cured layer on the surface of the object to be processed, wherein:

the ultraviolet curable paint comprises a photopolymerization initiator, a polymerizable monomer and a polymerizable oligomer;

the ultraviolet curable paint is not sensitive to light of not less than 380 nm in wavelength but sensitive to light of less than 380 nm in wavelength;

the ultraviolet radiation unit radiates light having a peak wavelength within a range of not greater than 350 nm, the paint cured layer has a maximum thickness of not less than 50 μm, during the ultraviolet irradiation step, the object to be processed is heated to and maintained at a constant temperature lower than a glass transition temperature of the paint cured layer obtained by irradiating the ultraviolet curable paint with the ultraviolet rays, and transmittance of the paint cured layer of the ultraviolet curable paint with respect to light having a wavelength of 380 nm is not lower than 95% of the ultraviolet curable paint before curing with respect to the light having a wavelength of 380 nm.

2. The curing process according to claim 1, wherein the ultraviolet radiation unit includes a rare gas fluorescent lamp.

* * * * *